(12) United States Patent
Krasnov

(10) Patent No.: US 6,636,545 B2
(45) Date of Patent: Oct. 21, 2003

(54) SUPERSONIC AND SUBSONIC LASER WITH RADIO FREQUENCY EXCITATION

(76) Inventor: Alexander V. Krasnov, 840 E. Eggerdon, Bryan, OH (US) 43506

( * ) Notice: Subject to any disclaimer, the term of this patent is extended or adjusted under 35 U.S.C. 154(b) by 81 days.

(21) Appl. No.: 09/799,379

(22) Filed: Mar. 5, 2001

(65) Prior Publication Data
US 2002/0097767 A1 Jul. 25, 2002

Related U.S. Application Data (63) Continuation-in-part of application No. 09/043,438, filed as application No. PCT/US96/15400 on Sep. 26, 1996, now Pat. No. 6,198,762.

(51) Int. Cl.[7] .............. H01S 3/22; H01S 3/00; H01S 3/097; H01S 3/09
(52) U.S. Cl. .............. 372/55; 372/701; 372/87; 372/90; 372/38.05
(58) Field of Search .............. 372/55, 38.05, 372/34, 701, 104, 87, 90, 86

(56) References Cited

U.S. PATENT DOCUMENTS

| | | |
|---|---|---|
| 3,543,179 A | 11/1970 | Wilson |
| 3,621,461 A | 11/1971 | Cason, III et al. |
| 3,681,710 A | 8/1972 | Lary et al. |
| 3,748,594 A | 7/1973 | Pugh |
| 3,998,393 A | 12/1976 | Petty |
| RE29,103 E | 1/1977 | Wilson et al. |
| 4,064,465 A | 12/1977 | Hundstad et al. |
| 4,100,507 A | 7/1978 | Born et al. |
| 4,194,169 A | 3/1980 | Rich et al. |
| 4,200,819 A * | 4/1980 | Haslund ............ 313/148 |
| 4,206,429 A | 6/1980 | Pinsley |
| 4,251,781 A | 2/1981 | Sutter, Jr. |
| 4,457,000 A | 6/1984 | Rao |
| 4,598,406 A | 7/1986 | Fino et al. |
| 4,686,681 A | 8/1987 | Paranto et al. |
| 4,756,000 A * | 7/1988 | Macken ............ 372/59 |

(List continued on next page.)

FOREIGN PATENT DOCUMENTS

| | | | | |
|---|---|---|---|---|
| JP | 59-68986 | * | 4/1984 | ......... H01S/3/097 |
| JP | 61-170087 | * | 7/1986 | ......... H01S/3/097 |
| JP | 8-32151 | * | 2/1996 | ......... H01S/3/036 |

Primary Examiner—Paul Ip
Assistant Examiner—Armando Rodriguez
(74) Attorney, Agent, or Firm—John F. Salazar; Middleton Reutlinger (57) ABSTRACT

Disclosed is a gas laser utilizing radio frequency excitation in the area of sonic or supersonic/subsonic transfer gas flow. The laser uses various types of gases and mixtures of gases as the active medium using radio frequency excitation. The gas is supplied into a supersonic nozzle for acceleration of the active gaseous flow to supersonic or deceleration to high subsonic speeds in order to provide intensive dynamic cooling of the active gas medium. The gas is excited using radio frequency excitation in the critical area of the supersonic nozzle or downstream therefrom. The radio frequency action and excitation can also occur within the optical resonator region which is located within the supersonic area of the nozzle.

46 Claims, 6 Drawing Sheets

U.S. PATENT DOCUMENTS

| | | | |
|---|---|---|---|
| 4,805,182 A | 2/1989 | Laakmann | |
| 4,837,772 A | 6/1989 | Laakmann | |
| 4,841,537 A | 6/1989 | Alexandrov et al. | |
| 4,875,218 A | * 10/1989 | Hongo | 372/64 |
| 4,885,754 A | 12/1989 | Egawa | |
| 4,937,834 A | 6/1990 | Egawa | |
| 4,939,738 A | * 7/1990 | Opower | 372/95 |
| 4,964,136 A | 10/1990 | Egawa | |
| 4,972,427 A | 11/1990 | Streifer et al. | |
| 4,974,229 A | 11/1990 | Egawa | |
| 5,008,894 A | 4/1991 | Laakmann | |
| 5,038,357 A | 8/1991 | Lavarini et al. | |
| 5,067,135 A | 11/1991 | Perzl et al. | |
| 5,091,914 A | 2/1992 | Maeda et al. | |
| 5,153,892 A | 10/1992 | Kawakubo et al. | |
| 5,200,971 A | 4/1993 | Wildermuth et al. | |
| 5,206,875 A | 4/1993 | Von Buelow et al. | |
| 5,206,876 A | 4/1993 | Von Buelow et al. | |
| 5,313,486 A | 5/1994 | Nakatani | |
| 5,682,400 A | 10/1997 | Krasnov | |
| 6,005,349 A | 12/1999 | Kunhardt et al. | |
| 6,198,762 B1 | 3/2001 | Krasnov | |

* cited by examiner

SUPERSONIC AND SUBSONIC LASER WITH RADIO FREQUENCY EXCITATION

The present application filed Mar. 5, 2001, is a continuation-in-part application of application Ser. No. 09/043,438, filed on Mar. 18, 1998, now U.S. Pat. No. 6,198,762.

BACKGROUND OF THE INVENTION

1. Field of the Invention

The present invention relates to supersonic and subsonic lasers which have a gaseous active medium, a nozzle, a RF discharge region, a laser active region, and an optical resonator.

2. Discussion of the Prior Art

Known gas laser systems use electrical discharges between DC or AC electrodes within transfer or axial flows. However, utilization of DC or AC electrodes, within fast subsonic and especially supersonic flows, creates unstable and non-uniform (in time and space) plasma discharges. These non-uniform discharges produce aerodynamic instability of the gas flow. This instability, characterized by wave shocks and turbulence, is proportional to the static pressure of the flow and volume of the discharge region between DC or AC electrodes. These limitations prevent creation of a stable, uniform and continuous plasma. AC/DC electrode discharges also create an additional aerodynamic resistance for gas flows which results in the necessity of a much higher power gas pump.

The aerodynamic instability of the supersonic and subsonic flows generated in the known gas lasers also produce regions of increased temperature, related to the wave shocks, as well as temperature pulsations, related to the turbulence. These factors are responsible for reduction of the laser inversion population, efficiency of the laser and optical quality of the flow within the resonator region.

Gas medium excitations, utilizing glow DC or AC discharges, are also well known. These laser designs, however, have other fundamental problems.

Glow discharge lasers are known to cause a low level of excitation density energy into discharge per one volume unit of plasma above which sparking takes place (i.e. are plasma areas). Thus, prior art designs may cause the creation of these localized arc plasma with a relatively short life time which will occur if the current density is higher than a critical level when glow plasma loses stability.

The arc plasma regions create a high atomic temperature of the laser gas which, like the result, will be free from laser activity. Thus, to maintain proper population inversion, these arc plasma areas must be kept to a minimum, something which is difficult to do utilizing prior art glow discharge type lasers.

Relative to the RF glow discharges, DC or AC glow discharges have a much less possible energy contribution to the same volume of stable non-equilibrium plasma. Typically, RF density requirement for excitation has ranged from 10 to 100 watt per cubic centimeter, depending on RF frequency and type of RF plasma (Alpha or Gamma). In the case of DC and AC glow discharges for identical gas conditions, the range of maximum possible density is only from 1 to 5 watt per cubic centimeter above which the sparking-plasma instability takes place.

There is additionally a principle difference between the nature of RF and DC/AC plasma structures. DC or AC discharges are based on the direct current of electrons and ions between an anode and a cathode. RF or a High Frequency Discharge structure is based on the high frequency oscillation of electron's boundaries located on the RF electrodes and stimulation of a "Positive Column" of ions and negative electrons between RF electrodes with the help of high frequency ionization by collision actions. This means that DC and AC discharges are much more capable of the disintegration of chemical stability of the laser gas medium, based on the dissociation, for example of $CO_2$ molecules to molecules of CO and atoms of O. That is why RF discharges are preferable to DC/AC type of discharges in the areas of chemical stability of the laser gas, energy contribution to the volume of the plasma, optical quality of the active medium and the power requirements for the gas pump for providing gas flow.

SUMMARY OF THE INVENTION

The present invention is for a supersonic or subsonic laser having radio frequency (RF) excitation and utilizing a gaseous flow of active medium. The laser of the present invention uses radio frequency (RF) excitation to generate a non-equilibrium plasma in the area of the sonic/subsonic or supersonic/subsonic gas flow. The high frequency excitation may occur within the critical area of the supersonic nozzle or downstream from the critical area within the nozzle. The laser of the present invention uses radio frequency RF excitation to generate a non-equilibrium plasma in the area of the sonic/subsonic or supersonic/subsonic gas flow. The high frequency excitation may occur within the critical area of the supersonic nozzle or downstream from the critical area within the nozzle.

The laser consists of a gas supply line which provides the gaseous medium into a receiver area. The gas may be supplied into the laser at a predefined pressure, depending upon the specific type of gas utilized. The gas passes through the supply line at slow subsonic speeds.

A supersonic nozzle opens into an optical resonator region and also contains a localized excitation area. The laser of the present invention may have a two-dimensional or flat nozzle interior.

The laser device of the present invention provides for high output power of laser generation and highly efficient use of the gaseous active medium in order to generate an extremely efficient laser while utilizing a simplistic design and relatively low energy supply. The laser can use various gases or mixtures of gases in combination with radio frequency discharge excitation between a large rectangular flat RF electrode and an opposite grounded laser body in the area of sonic/subsonic or supersonic/subsonic flow of the gas active medium.

The laser of the present invention utilizes a radio frequency (RF) discharge which creates a non-equilibrium "Alpha" or "Gamma" plasma through ionization and electron excitation of high states of atoms, molecules or ions in order to achieve a high inversion population necessary to generate lazing activity in the optical resonator region.

The laser of the present invention has a high frequency discharge region between the wide linear RF electrode and the grounded metal body of the tunnel or nozzle in the area of the sonic/subsonic (M=1/M<1) or supersonic/subsonic (M>1/M<1) flow of the gaseous active medium. Radio frequency (RF) excitation action creates almost uniform distributions of ions PC ("Positive Column") and electrons into the discharge region. The radio frequency discharge region is located between the plane RF electrode and the grounded opposite side of the dielectrically insulated nozzle portion and can be located within the critical area of the supersonic nozzle or downstream of the critical area within the supersonic area of the nozzle.

The excitation region of the laser may have a more extensive area relative to the discharge region, depending upon the active medium or the pressure of the gas and may occur within the critical and supersonic areas of the nozzle up to the beginning of the optical resonator area. Alternatively, the location of RF electrode and discharge region can be partially coextensive or coextensive with the optical resonator region.

Within the optical resonator region is located the laser active region. This region is transferred by the resonator beam phases thereby taking advantage of the maximum level of laser inverse present and generating resonance photon amplification. The lasers generated by Radio Frequency excitation of the present invention may be within the wavelength range from 0.4 um. for Ar and up to 10.6 um. for other gases.

Located downstream and at the end of the receiver area is a supersonic nozzle. The two-dimensional supersonic nozzle has an optimal profile which may be symmetrical or asymmetrical to insure a quiet supersonic/subsonic flow having an uniform transverse distribution of thermodynamic parameters allowing for the adiabatic expansion of the gases within the nozzle. The supersonic nozzle opens into and within the optical resonator region to insure parallel supersonic/subsonic flow within the supersonic area of the nozzle. The supersonic area of the nozzle occurs down stream from the critical section of the nozzle. The laser head may be integrated with the RF resonator or with an RF amplifier as part of the power supply.

The present invention includes a radio frequency excited laser comprising a laser body retaining a gas medium within a gas flow path, said gas medium entering in a gas inlet and passing longitudinally through a nozzle, at least one RF electrode operably connected to an RF resonator, said RF resonator powered by an RF power supply, a dielectric plate insulating said at least one RF electrode, a dielectric coating opposite said gas flow path from said dielectric plate separating said laser body from said gas flow path, wherein said laser body adjacent said dielectric coating is grounded, an optical resonator within said gas flow path, at least one turbine in flow communication with said gas flow path, and an RF matching device operably connected to said at least one RF electrode and said RF power supply.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

Figure 1:
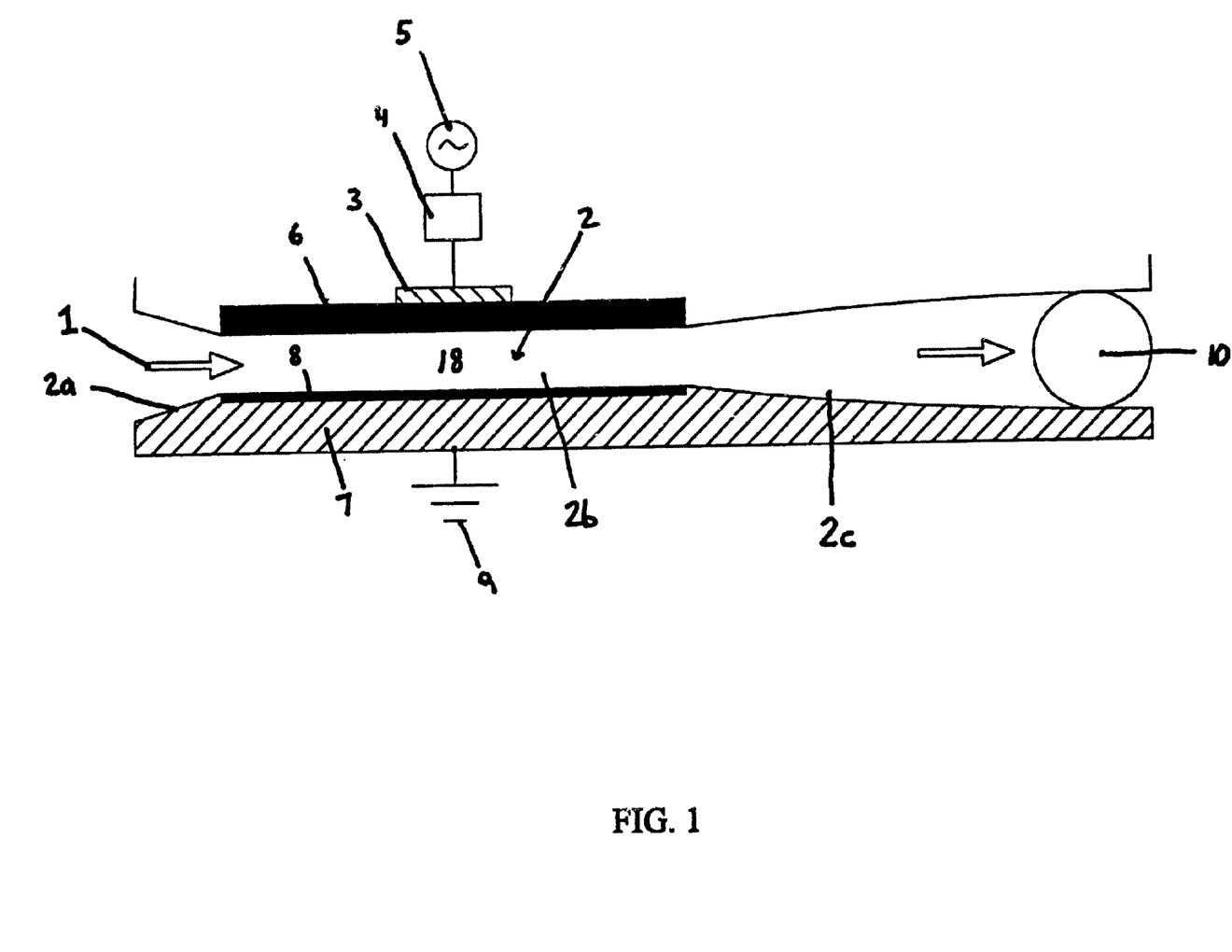
FIG. 1 is a side sectional view of a supersonic and subsonic laser with RF excitation of the present invention having a radio frequency (RF) discharge region within the critical area of the nozzle with a resonator located within the supersonic nozzle down stream the RF discharge region.

An example of the laser of the present invention is shown in FIG. 1. A single RF electrode 3 is placed within the critical area 2b of the nozzle 2. The optical resonator 10 is located down stream the RF discharge area 18 and within the supersonic area 2c of the nozzle 2. The RF electrode 3 is insulated from the discharge area 18 by the dielectric plate 6. The opposite side 9 of RF discharge chamber is a grounded metal body 7 of the nozzle or tunnel 2 with a wide area of dielectric insulation 8 along the discharge (plasma) area 18. The laser gas medium 1 passes through the nozzles 2 sections: subsonic 2a, sonic 2b and supersonic 2c with acceleration from subsonic up to supersonic speeds or with deceleration to high subsonic speeds. The RF electrode 3 is in electrical communication with the RF resonator or matching device 4, which is electrically connected to RF power supply 5.

Figure 2:
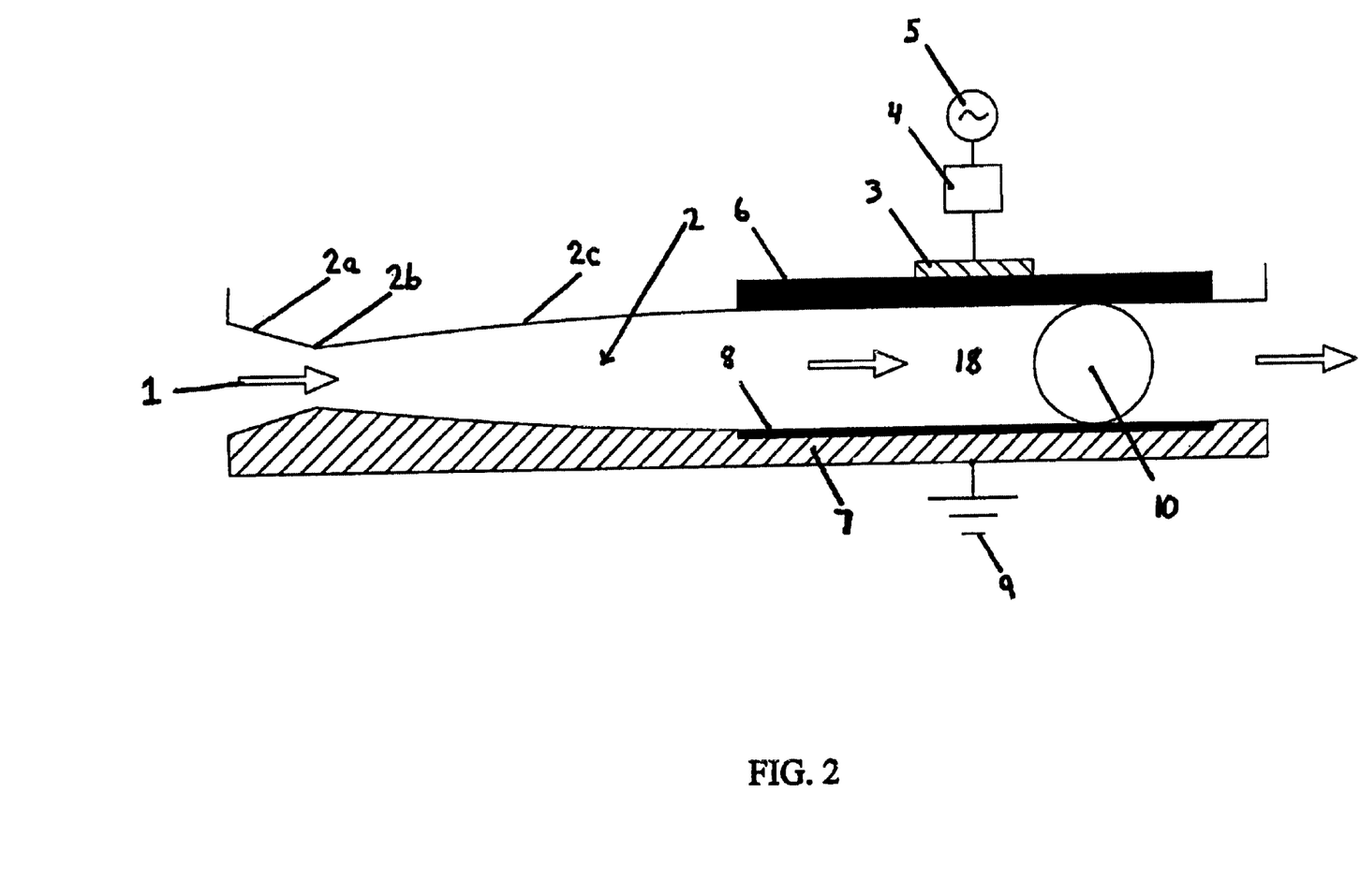
FIG. 2 is a side sectional view of a laser of the present invention having a radio frequency (RF) discharge region downstream the critical area of the nozzle and upstream the optical resonator region.

In FIG. 2 an alternative design of the laser of the present invention is shown. A single RF electrode 3 is placed within the supersonic area 2c of the nozzle 2 and the optical resonator 10 is down stream of the RF plasma action or excitation region 18. This design allows the optical resonator to be somewhat coextensive with the excitation region generated by the electrode 3.

Figure 3:
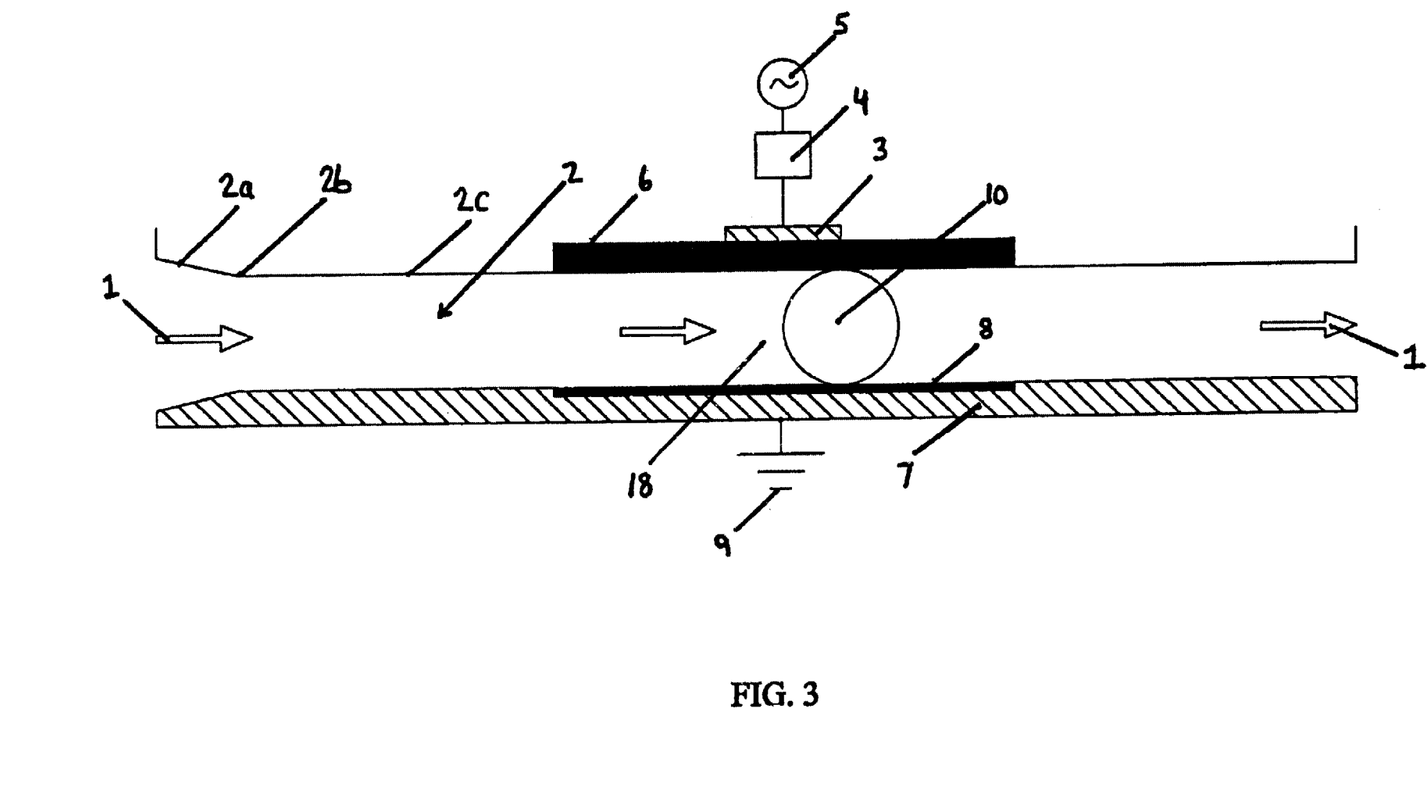
FIG. 3 is a side sectional view of a laser of the present invention having a radio frequency (RF) discharge region partially coextensive and partially up stream of the optical resonator region.

In FIG. 3 is shown an additional alternative structural embodiment. A single RF electrode 3 with dielectric plate insulation 6 and coextensive dielectric coating 8 on the opposite grounded side 7 are placed within the supersonic area 2c of the nozzle 2, with a coefficient of expansion being A=1 (i.e. there is zero expansion). The optical resonator 10 is located partially coextensive and partially down stream the RF discharge region 18.

Figure 4:
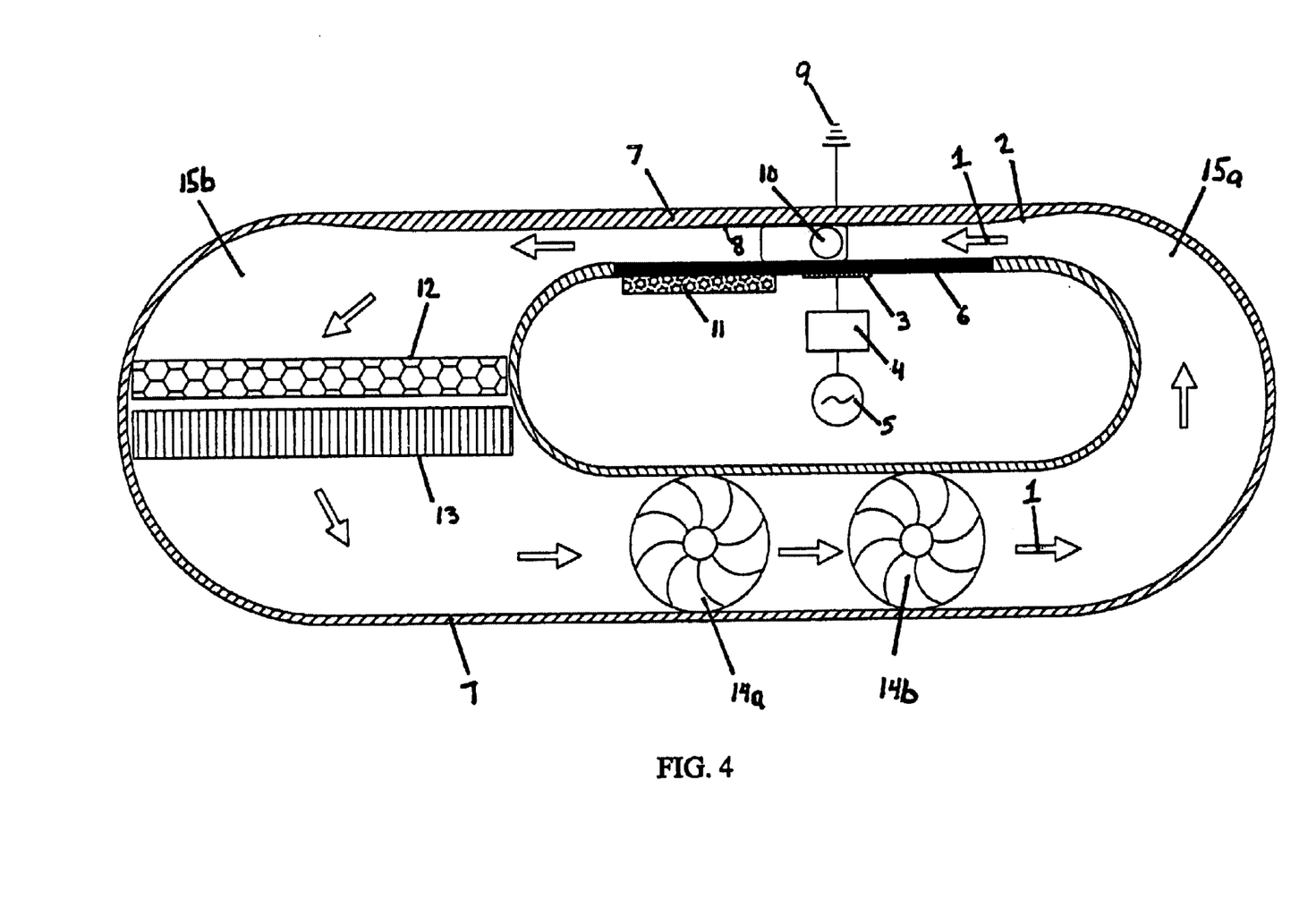
FIG. 4 is a side sectional view of an assembled laser of the present invention having a single RF electrode, with dielectric insulation within the nozzle and a radio frequency (RF) discharge area partially coextensive and partially up stream of the optical resonator, a water "cold" plate on the ceramic plate, a catalyst section down stream of the resonator or diffuser, an outlet heat exchanger down stream of said catalyst and having two turbines connected in series within a laser body.

In FIG. 4 is shown an assembled laser construction based on the principle model shown in FIG. 3. The "cold" plate 11 with water connection provides the cooling of the ceramic plate 6. The insulation cold plate 11 is used to increase the capacitance of the RF electrode, stabilize the RF plasma, prevent hot spots within the gas flow thereby reducing turbulence and providing chemical insulation of the metal electrode from direct plasma action. The water cooling plate may be placed down stream of the RF electrode 3. The cooling cold plate 11 is used to cool the insulation ceramic plate 6 in order to prevent cracking caused by thermal tension inside the material.

The chemical catalyst 12 is down stream and in flow communication with the nozzle 2. The chemical catalyst 12 is used to chemically recombine atoms of CO and O into $CO_2$ for these types of gases. These chemicals would normally contaminate the plasma within the laser. By removing these chemicals, an increase in the efficiency and the output power of the laser of the present invention is seen with correspondent reduction of the gas consumption. Different catalysts may be used but the present design calls for a catalyst having honeycomb ceramic sections coated by Platinum, the hot laser gas passing through the honeycomb to recombine elements as noted above.

The outlet heat exchanger 13 is down stream and in flow communication with the catalyst 12. The heat exchange 13 is utilized to remove the heat from the laser gas after plasma action. As understood, the RF power utilized to excite the gas flow translates to power in the laser output, heating of the gas and random emissions of UV from the plasma. By utilizing the heat exchanger, it cools the gas flow and maintains the system in a controlled thermal balance.

Two turbines 14a and 14b are down stream and in flow communication with said heat exchanger 13. The turbines 14a and 14b may be centrifuge turbines which produce a high flow rate and a high coefficient of pressure ratio (up to 2) which may be necessary for supersonic speeds of gas flow. Other types of turbines may be utilized, such as long impellers, which provide for transfer flow having a good flow rate but a lower pressure ratio of about 1.1.

Figure 5:
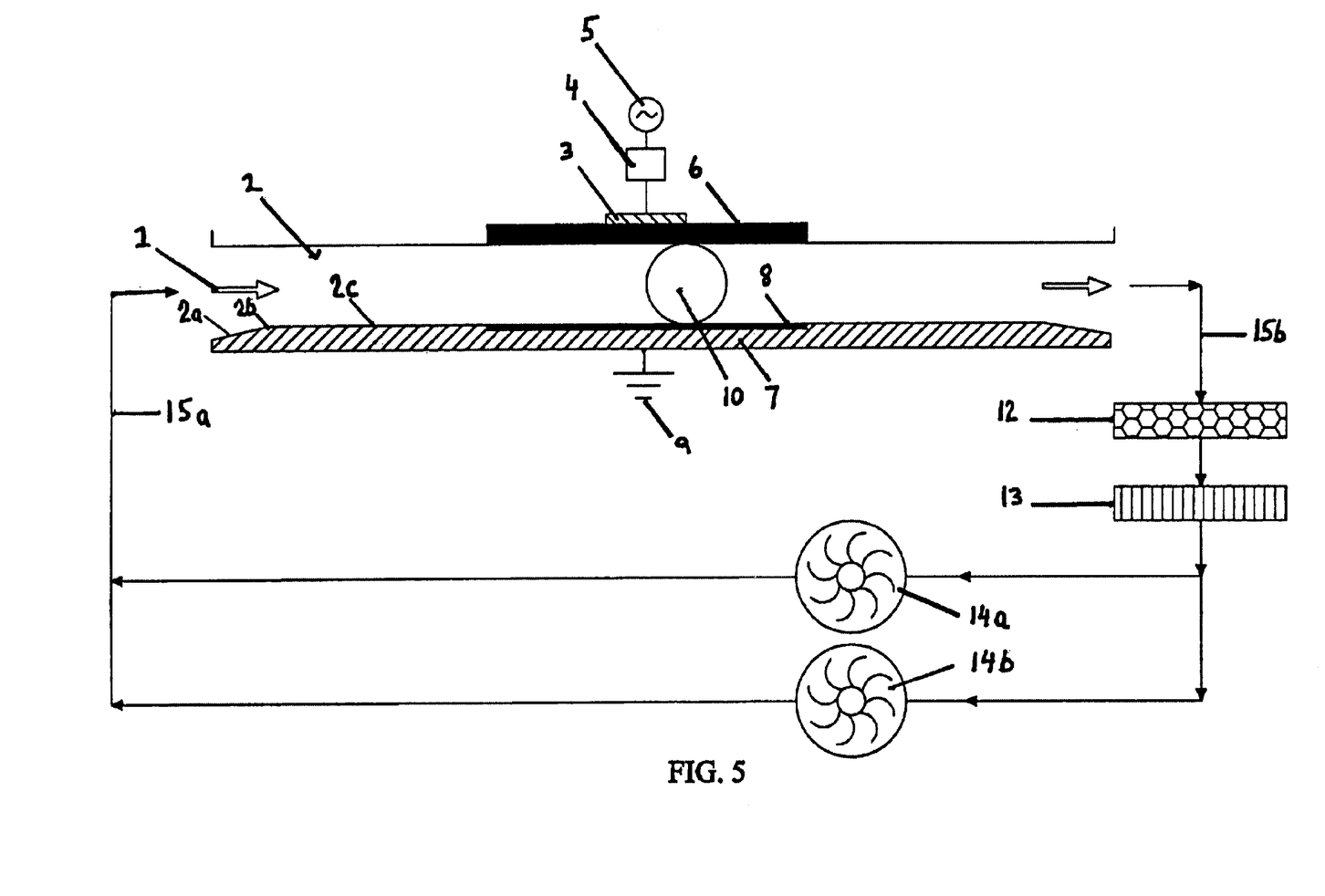
FIG. 5 is a schematic side view of a laser of the present invention having two turbines connected in parallel; and, FIG. 6 is a sectional view of a laser RF chamber cavity of the present invention having two single independent RF electrodes placed along the axis of an optical resonator.

In FIG. 5 is shown the principal schematic of the laser shown in FIG. 4. In this model, the asymmetrical two dimension nozzle 2 with the coefficient of expansion of one (1) is used. Two in parallel turbines 14a and 14b are in flow communication with the heat exchanger 13 and the nozzle 2. The heat exchanger 13 is shown downstream of the resonator region 10 and also downstream from the chemical catalyst 12. Both the heat exchanger and the chemical catalyst work to improve the stability and dynamic properties of the laser of the present design. Also depicted is gas supply line 15a which feeds gas into the laser inlet or receiver area as well as gas outlet line 15b which directs the gas to pass through the heat exchanger and chemical catalyst and towards the turbines.

Figure 6:
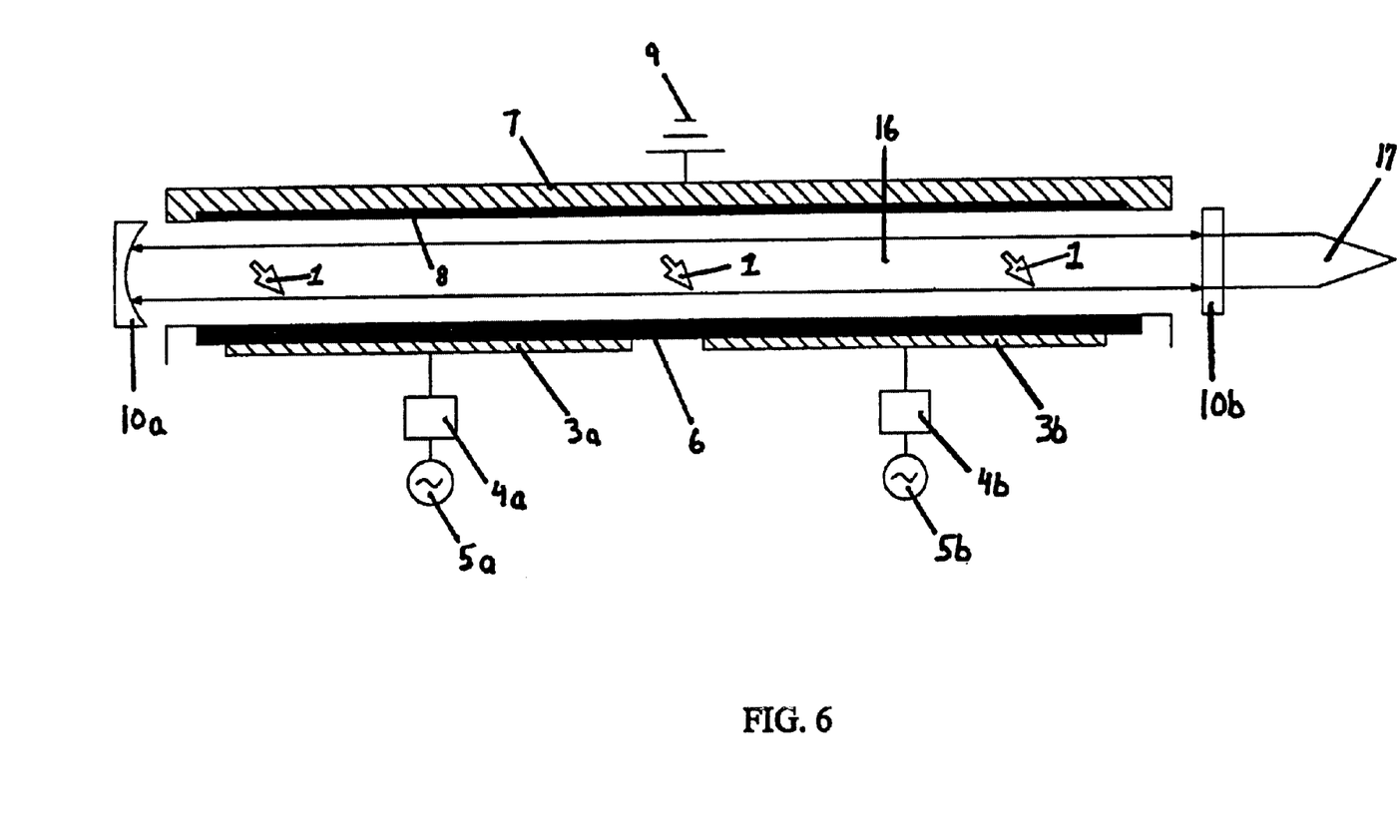

In the schematic of FIG. 6 is shown two single independent RF electrodes 3a and 3b placed on the common dielectric plate 6 along the optical axis. Two independent RF resonators 4a and 4b and two RF power supplies 5a and 5b are in electrical connection with the RF electrodes. The opposite side of the nozzle is a single metal grounded wall 7 of the laser body with dielectric insulation 8 made coextensive with RF electrodes and dielectric plate 6. After multi-passing into the optical resonator, the output laser beam 17 is emitted from the laser. Mirrors 10a and 10b are also shown within the resonator region.

As shown in FIGS. 4 and 5, the active gas medium 1 is introduced into the system by a gas turbines 14 which forces the gas under predetermined pressure. The predetermined pressure at which the gas is supplied is determined by the gas medium and typically the static pressure within the system has a range between 50 and 760 torr. The gas circulates in a closed system as depicted but alternative open system designs may be utilized.

All laser body portions may be comprised of a cast aluminum or aluminum alloy except for the large dielectric plate 6 and the dielectric coating 8.

Dielectric plate 6 and the dielectric coating 8 are used for their high capacitance and the insulation of the metal RF electrode and the metal nozzle from the discharge region to avoid direct contact between metal surfaces and the laser gas in the area of plasma activity. The dielectric insulation of the RF electrode also provides a stabilization of RF discharge thereby keeping it free from hot spots and sparking. The dielectric insulation plate 6 is comprised of a non-conductive highly thermal conductive ceramic (for example Aluminum Oxide $Al_2O_3$ or others) with a range of thickness of between 1 mm. and 25 mm. and may be water cooled to remove stress and other problems with the thermal properties of the ceramic.

The dielectric insulation 8 is comprised a non-conductive ceramic coating (for example Aluminum Oxide $Al_2O_3$ or others) with a range of the thickness of the ceramic coating between 0.5 mm and 5 mm.

The laser of the present invention can use the following gaseous active mediums:

a: $CO_2$:$N_2$:He;
b: CO;
c: Xe:Ar:He;
d: Xe:Kr:He:
e: He:Ne;

For gaseous mediums "a" and "b", the radio frequency discharge laser uses the molecular transitions based upon ionization and electron excitation of the of the high vibrational and rotational states of molecules. In this case, the high frequency discharge laser is molecular and produces laser infrared radiation, on the vibration transitions, with a wavelength of 9.6 um and 10.6 um for "a" and around 5 um for "b". A carbon monoxide molecule is capable also of generation in the area of visible (green light) with the wavelength of around 0.5 um. using electron's transitions. For active mediums "c", "d" and "e", the radio frequency discharge laser uses atomic transitions with generation of 2.03 um emission for "c", a visible laser emission with the wavelength of around 0.63 um for "e", and around 0.4 um for "d".

The absolute pressure of the laser gas in the nozzle 2 is dependent upon the type of gaseous active medium used and also upon the gas consumption caused by the lazing activity. The range of possible pressure is between 1 torr and 760 torr. This may also depend upon output power of the laser emission, the height of the discharge region 18 and power and frequency of RF excitation.

As an example, a laser utilizing the design set forth herein may have the following specifics: high subsonic speed of the gas flow of about 0.2 M–0.4 M (approximately 100–200 meters/second) with a $CO_2$:$N_2$:He mixture of gas. The static pressure in the resonator may be about 65–75 torr. The two turbines may have a speed of about 25,000 to 40,000 rpm which creates a flow through the laser of around 1 cubic meter per second. The $CO_2$ laser may have an average output power of the emission of approximately 3,500 watts with an RF power input from the power supply of about 20 kWt.

As shown in FIG. 1, the radio frequency discharge region 18 is located within the critical area 2b of the supersonic nozzle. The radio frequency discharge region 18 is created between dielectric insulated plane RF electrode 3 and grounded dielectric insulated nozzle's surface 7. The non-equilibrium plasma, created by the RF boundary electron oscillation, occupies the area of the sonic/subsonic gas flow, in this particular embodiment, in the critical area 2b of the supersonic nozzle 2 of FIG. 1.

The excitation region in FIG. 1, which includes the discharge region 18 and some distance downstream of the discharge region, is the area where the laser activity energies, determined as optical rise time, exist. This area is located immediately preceding the optical resonator region 10 within which the optical resonator mirrors 10a and 10b, shown in of FIG. 6, are located. The entire region, defined as a portion of supersonic nozzle 2 including a portion of the excitation region 18 and all of the optical resonator region 10, is the laser active region. This region is the area where the static temperature of the supersonic flow reaches its minimum level and where maximum photon amplification on resonance transitions takes place.

The laser inversion required for creation of laser energy reaches a maximum level within the laser active region, particularly if the RF electrode is located within the critical area of the supersonic nozzle, as shown in FIG. 1.

The two-dimensional supersonic nozzle 2 of the present invention is exemplified in FIG. 1. By two-dimensional, it is meant that the profile of the supersonic nozzle depends upon two axis X and Y (also called a flat nozzle). This narrowing of the Y axis to create the critical portion of the nozzle causes the adiabatic expansion of the gas flowing therethrough. The two dimensional nozzle of the present invention may be symmetrical or asymmetrical as shown in FIGS. 4 and 5.

The nozzle 2 of the present invention is comprised three parts: subsonic area 2a, critical area 2b and supersonic area 2c. The nozzle 2 is designed to have a minimum length along the gas flow X axis and smooth optimal aerodynamic form to insure a uniform quiet supersonic or subsonic flow within the optical resonator region 10. The supersonic area of the nozzle has an optimal aerodynamic profile beginning at the critical area of the nozzle and opening into and within the optical resonator region 10. The range of speed of the gas flow in the supersonic area of the nozzle within the resonator region is from subsonic speed 0.1 M to supersonic 5 M, (M equals speed of sound) depending upon the active medium used and gradient of static pressure of the gas between subsonic area 2a and supersonic area 2c of the nozzle. The coefficient of the expansion of the supersonic nozzle A=H/h (where H is the height of the nozzle after expansion and h is the height of the critical area of the nozzle) may have the range from 1 (as shown on FIGS. 3, 4 and 5) to 30. The height "h" of the critical section 2b of the nozzle or distance between dielectric insulations may have a range between 4 mm and 40 mm.

The height "H" of the gas flow within the resonator region has the range from 4 mm up to 40 mm. The cross-sectional width of the nozzle 2 may have a range between 10 and 200 cm. The typical width is about 50 cm. The length of the RF electrode may be from 10 cm up to 100 cm.

The width of RF electrode 3 along the gas flow X axis can be from 2 cm to 20 cm. The typical length is about 5 cm. and may be specially made from Aluminum having a water cooling cold plate.

The dielectric insulations 6 and 8 are used for the insulation of metal surfaces of RF electrodes from contact with ionization gas flow and stabilization of RF discharge into the gap 18 in order to effect a maximum possible energy contribution to the plasma.

The RF excited laser of the present design may utilize an RF matching device (correspondent with the RF resonator) which insures the correlation between the plasma impedance and the impedance of the RF power supply 5. The RF matching device may be comprised of at least one inductor, although two may preferentially be used, in combination with one or two capacitors. Alternatively, an inductor and transformer may be utilized. The RF matching device utilized in the RF excited laser of the present invention preferably matches the resonance of the two impedances mentioned such that the RF energy supplied is utilized for plasma generation with minimal reflection. As an example, the typical load of the RF power supply is 50 Ohms, but the laser RF electrode with the plasma may have a load of 200 Ohms. The RF matching device may reduce the lost energy caused by this differential in impedance. The RF matching device utilized herein may be used in conjunction with the RF power supply or alternatively it may be integrated with an RF power amplifier directly thereby removing the necessity of a separate RF matching device.

The supersonic area of nozzle 2c causes intensive adiabatic expansion of the gaseous active medium resulting in an extremely low static gas temperature of the supersonic gas medium and reduces population of the lower energy states of atoms and molecules of said medium. The range of the static gas temperatures in the supersonic flow within the supersonic area 2c depends on the speed of gas flow (between Mach 0.01 M to 5 M) and is typically between 50 and 285 degrees of Kelvin. For a typical supersonic flow exhibiting a speed of Mach=2, the static temperature is 165 K. This low static temperature of the supersonic flow reduces population of the lower energy states of molecules and creates an increasing laser inversion population, coefficient of amplifier of the active medium, output power and overall efficiency of the laser and also aids in the full utilization of non-equilibrium plasma created by radio frequency discharge excitation. Creation of extremely low atomic temperatures resulting from dynamic cooling of the gas flow within the supersonic nozzle 2c enables the laser to produce significantly increased laser energy and efficiency of the laser system. This dynamic cooling of the gas flow is created by the intense adiabatic expansion of the gas into the supersonic area of the nozzle due to the inventive design. For a $CO_2$ laser, this may reach an efficiency level of up to 20–30%. The efficiency may reach 20% for a CO laser. The output power of the present laser may reach the multi-kilowatts range for said active mediums and may be further increased up to a maximum level which is limited by the maximum possible internal resonator intensity of the laser emission, volume of RF plasma, frequency of RF plasma, the time of generation (time of pulse, pulsing or CW, from microseconds to CW) and the heating of the resonator mirrors.

The resonator 10a and 10b mirrors may be copper mirrors, for example, which have a highly reflective coating (approaching 99.8% reflectivity) and the mirrors can be water cooled for CW long operation. However, standard metal mirrors may be utilized and are stable for power densities of up to 10 $kWt/cm^2$.

Additionally, the optimal aerodynamic forms of the present laser interior produces quasi-laminar supersonic or subsonic flow within the resonator region when the number of Reynolds (non-dimensional number involving the flow velocity and fluid viscosity, a measure of the flow rate and level of turbulence in the flow) is below the critical level (Re<100000). This "smooth" quasi-laminar flow, free from wave shocks and turbulence, produces a high optical quality, as well as increasing the optical quality of the output laser beam.

The dielectric insulators 6 and 8 may have a much wider area than RF electrode 3. A wide dielectric or air insulation of RF electrodes from metal parts of the laser body is necessary to increase a complex resistance (impedance) relative to the metal body and to reduce impedance relative to the discharge gap in order to increase the possible RF energy through the plasma between dielectric insulators but not to the metal laser body. The typical gap between RF electrode and metal laser body should be at least three times greater than the height of the discharge gap 18.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims. Examples given herein are done so for clarity purposes and are meant solely for exemplification purposes only. No unnecessary limitations are to be imposed or read into the examples or description hereof.

What is claimed is:

1. A radio frequency excited laser comprising:
   a gas medium entering in a gas inlet and passing longitudinally through a supersonic metal nozzle within a laser body and an optical resonator within said nozzle downstream of said gas inlet;
   said RF electrode on a first side of said laser body outside said nozzle, an opposing side of said laser body electrically connected to a grounding source, and a dielectric plate insulating an RF electrode, said body dielectrically insulated from said gas medium, said RF electrode exciting said gas active medium by intensive ionization of said gas between said RF electrode and said opposing side of said laser body.

2. The radio frequency excited laser of claim 1 wherein said nozzle is a subsonic nozzle.

3. The radio frequency excited laser of claim 1 wherein said nozzle is a supersonic nozzle.

4. The radio frequency excited laser of claim 1 wherein said optical resonator is coextensive wit said RF electrode.

5. The radio frequency excited laser of claim 1 wherein said optical resonator is downstream of said RF electrode.

6. The radio frequency excited laser of claim 1 wherein said optical resonator is partially coextensive with said RF electrode.

7. The radio frequency excited laser of claim 1 wherein said gas inlet is in flow communication with at least one turbine.

8. The radio frequency excited laser of claim 7 wherein said at least one turbine is comprised of a first turbine and a second turbine, said first and second turbine in parallel connection.

9. The radio frequency excited laser of claim 7 wherein said at least one turbine is comprised of a first and a second turbine, said first and said second turbine in serial connection.

10. The radio frequency excited laser of claim 1 further comprising a gas outlet adjacent said resonator and in flow communication with a catalyst.

11. The radio frequency excited laser of claim 10 wherein said gas catalyst is in flow communication with a heat exchanger.

12. The radio frequency excited laser of claim 1 wherein said nozzle is comprised of a subsonic area, critical area and a supersonic area.

13. The radio frequency excited laser of claim 12 wherein said nozzle is a supersonic nozzle and has a height in said critical area of up to 40 mm.

14. The radio frequency excited laser of claim 12 wherein said nozzle has a coefficient of expansion from 1 to 30.

15. The radio frequency excited laser of claim 12 wherein said nozzle has a symmetrical configuration.

16. The radio frequency excited laser of claim 12 wherein said nozzle has an asymmetrical configuration.

17. The radio frequency excited laser of claim 1 wherein said dielectric plate has a surface area greater than the surface area of said RF electrode.

18. The radio frequency excited laser of claim 1 further comprising a dielectric coating on said metal nozzle opposite said dielectric plate, said metal nozzle adjacent said dielectric coating grounded, wherein said dielectric coating has a surface area greater than the surface area of said RF electrode.

19. The radio frequency excited laser of claim 1 wherein said RF electrode is in electrical connection with an RF resonator.

20. The radio frequency excited laser of claim 19 wherein said RF resonator is in electrical connection with an RF Power supply.

21. The radio frequency excited laser of claim 17 wherein said dielectric plate is made of a non-conductive material.

22. The radio frequency excited laser of claim 21 wherein said ceramic dielectric plate is water cooled.

23. The radio frequency excited laser of claim 17 wherein said dielectric plate has the thickness from 3 mm up to 30 mm.

24. The radio frequency excited laser of claim 18 wherein said dielectric coating is a non-conductive ceramic coating with a thickness from 1 mm up to 5 mm.

25. The radio frequency excited laser of claim 12 wherein said RF electrode is placed within said critical area of said nozzle.

26. The radio frequency excited laser of claim 12 wherein said RF electrode is placed within said supersonic area of said nozzle.

27. The radio frequency excited laser of claim 26 wherein said optical resonator is coextensive with said RF electrode.

28. The radio frequency excited laser of claim 26 wherein said optical resonator is placed down stream of said RF electrode.

29. The radio frequency excited laser of claim 26 wherein said optical resonator is partially coextensive and partially down stream of said RF electrode.

30. The radio frequency excited laser of claim 1 wherein said RF electrode is a first and a second RF electrode longitudinally placed on one side of said laser.

31. The radio frequency excited laser of claim 30 wherein said first and second RF electrode are in electrical connection with an RF matching device.

32. The radio frequency excited laser of claim 31 wherein said RF matching device is in electrical connection with an individual RF power supply.

33. The radio frequency excited laser of claim 1 wherein said laser is further comprised of a laser body, said laser body made of an Aluminum or Aluminum Alloy.

34. The radio frequency excited laser of claim 1 wherein said gas medium is comprised of at least a portion of carbon monoxide.

35. The radio frequency excited laser of claim 1 wherein said gas medium is comprised of at least a portion of carbon monoxide, helium, nitrogen or mixtures thereof.

36. The radio frequency excited laser of claim 1 wherein said gas medium is comprised of at least a portion of xenon, argon, helium or mixtures thereof.

37. The radio frequency excited laser of claim 1 wherein said gas medium is comprised of at least a portion of xenon, krypton, helium or mixtures thereof.

38. The radio frequency excited laser of claim 1 wherein said gas flow within said nozzle has the range of speed from 0.01M up to 5M.

39. The radio frequency excited laser of claim 1 wherein said gas within said nozzle has the a static pressure from 1 Torr up to 200 Torr.

40. The radio frequency excited laser of claim 1 wherein said nozzle has a longitudinal dimension of from 5 cm up to 100 cm.

41. The radio frequency excited laser of claim 1 wherein said optical resonator is a single pass amplification resonator.

42. The radio frequency excited laser in claim 1 wherein said optical resonator is a multi-pass amplification resonator.

43. A radio frequency excited laser comprising:
- a metal laser body retaining a gas medium within a gas flow path, said gas medium entering in a gas inlet and passing longitudinally through a supersonic nozzle and an optical resonator within said gas flow path;
- a first RF electrode within said nozzle and a dielectric plate insulating said RF electrode;
- a dielectric coating opposite said dielectric plate separating Bald laser body from said gas flow path, said metal laser body adjacent said dielectric coating and opposing said RF electrode electrically grounded, said RF electrode exciting said gas active medium by intensive ionization of said gas between said RF electrode and said opposing dielectric plate;
- at least one turbine in flow communication with said gas flow path.

44. A radio frequency excited laser comprising:
- a laser body retaining a gas medium within a gas flow path, said gas medium entering in a gas inlet and passing longitudinally through a supersonic nozzle, an optical resonator within said gas flow path, said nozzle having a subsonic area, critical area and supersonic area;
- an RF electrode outside said nozzle;
- a dielectric plate insulating said RF electrode;
- a dielectric coating opposite said gas flow path from said dielectric plate separating said laser body from said gas flow path;
- wherein said laser body adjacent said dielectric coating and opposing said RF electrode is electrically grounded, said RF electrode exciting said gas active medium by intensive ionization of said gas between said RF electrode and said opposing dielectric plate;
- at least one turbine in flow communication with said gas flow path;
- a chemical catalyst in said gas flow path;
- a heat exchanger downstream of said chemical catalyst and within said gas flow path.

45. A radio frequency excited laser comprising:
- a laser body retaining a gas medium within a gas flow path, said gas medium entering in a gas inlet and passing longitudinally through a supersonic nozzle, an optical resonator within said gas flow path, said nozzle having a subsonic area, critical area and supersonic area;
- at least one RF electrode operably connected to an RF resonator, said RF resonator in electrical connection with an RF power supply;
- a dielectric plate insulating said RF electrode; a dielectric coating opposite said gas flow path from said dielectric plate separating said laser body from said gas flow path;
- wherein said laser body adjacent said dielectric coating is electrically grounded, said RF electrode exciting said gas active medium by intensive ionization of said gas between said RF electrode and said opposing dielectric plate;
- at least one turbine in flow communication with said gas flow path;
- a chemical catalyst in said gas flow path and downstream of said optical resonator;
- a heat exchanger downstream of said chemical catalyst and within said gas flow path;
- an RF matching device operably connected to said at least one RF electrode and said RF power supply.

46. A radio frequency excited laser comprising:
- a laser body retaining a gas medium within a gas flow path, said gas medium entering in a gas inlet and passing longitudinally through a supersonic nozzle and an optical resonator within said gas flow path;
- an RF electrode on a first side of said laser body operably connected to an RF resonator, said RF resonator electrically connected to an RF power supply, said laser body electrically connected to a grounding device opposite said RF electrode, a ceramic dielectric plate insulating said RF electrode, said RF electrode exciting said gas active medium by intensive ionization of said gas between said RF electrode and said opposing side of said laser body;
- a dielectric coating opposite said gas flow path from said dielectric plate separating said laser body from said gas flow path;
- at least one turbine in flow communication wit said gas flow pat.

* * * * *

UNITED STATES PATENT AND TRADEMARK OFFICE
CERTIFICATE OF CORRECTION

PATENT NO. : 6,636,545 B2
DATED : October 21, 2003
INVENTOR(S) : Alexander V. Krasnov It is certified that error appears in the above-identified patent and that said Letters Patent is hereby corrected as shown below:

<u>Title page,</u>
Item [63], Related U.S. Application Data, change the priority claim to read:
-- Continuation-in-part of application No. 09/043,438, filed on 03/18/1998, now Patent No. 6,198,762, which claims priority to PCT/US96/15400, filed on 09/26/1996 --;

<u>Column 3,</u>
Line 27, change "insure" to -- ensure --;

<u>Column 6,</u>
Line 18, delete second occurrence "of the";
Line 63, after "in" delete "of";

<u>Column 10,</u>
Line 58, after "has" delete "the";

<u>Column 11,</u>
Line 9, change "Bald" to -- said --;

<u>Column 12,</u>
Line 43, change "wit" to -- with --;
Line 44, change "pat" to -- path --.

Signed and Sealed this

Thirteenth Day of July, 2004

JON W. DUDAS
*Acting Director of the United States Patent and Trademark Office*